April 5, 1927. 1,623,276
H. C. SCHAPER
WEIGHING DEVICE
Filed March 27, 1923   6 Sheets-Sheet 5

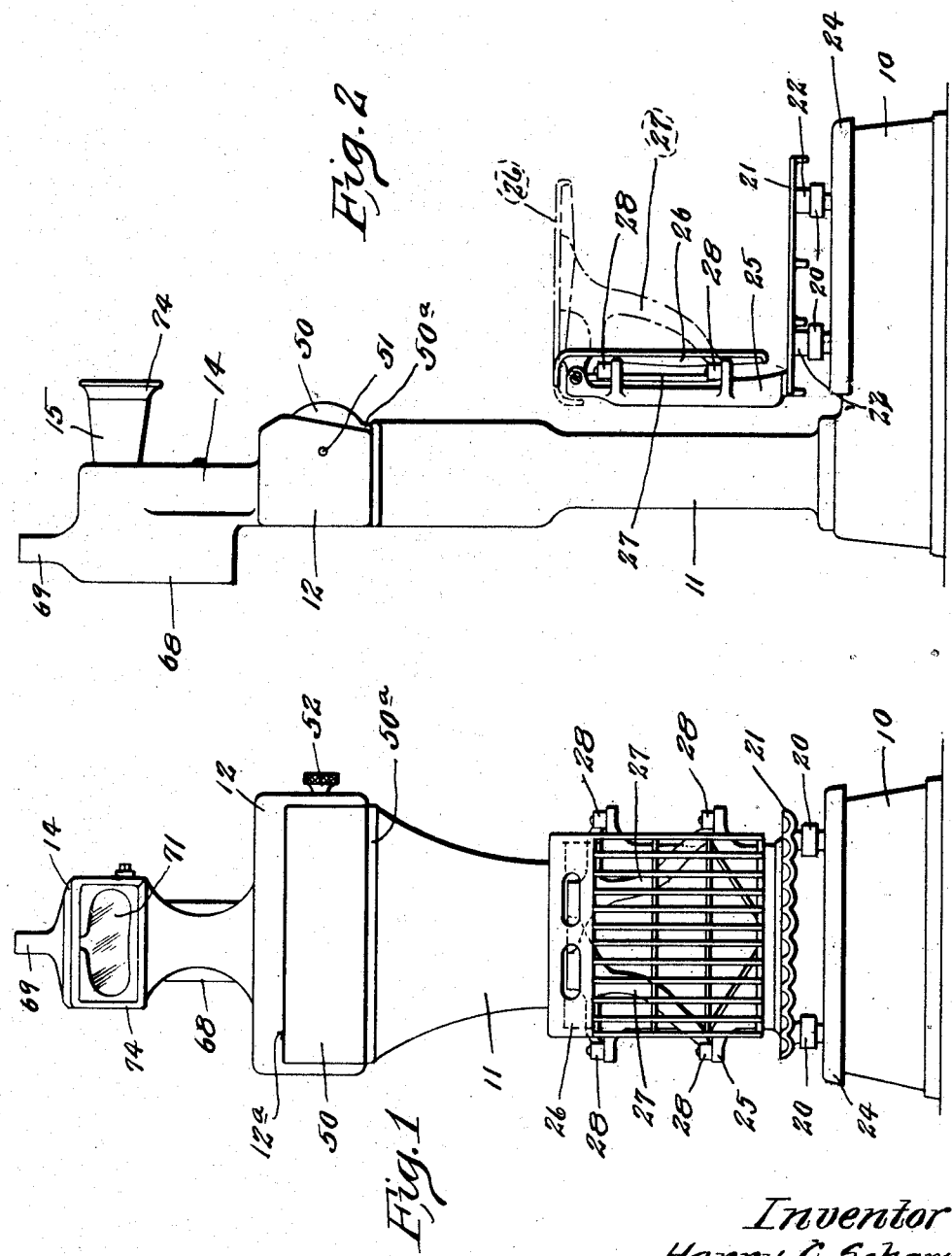

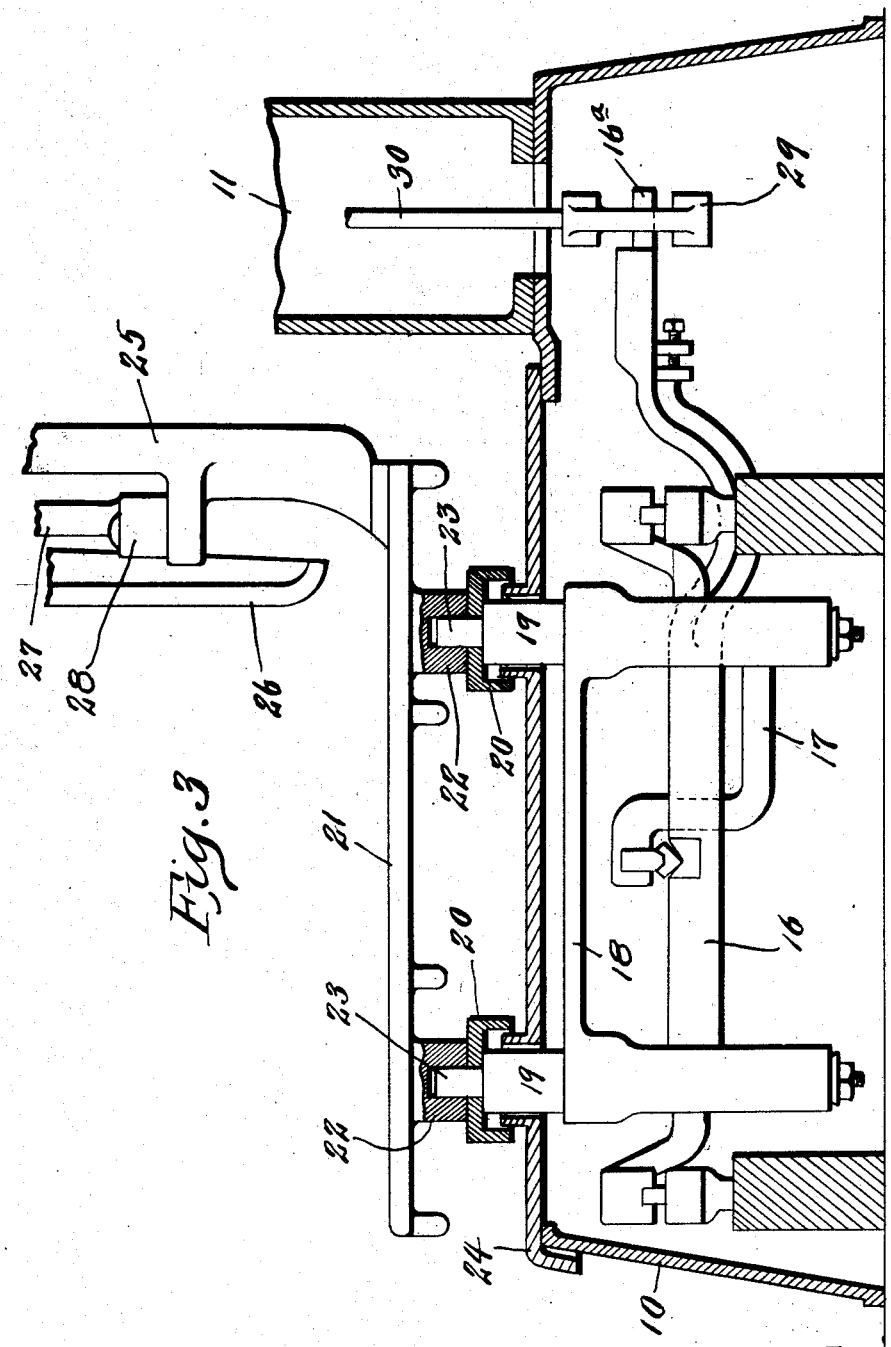

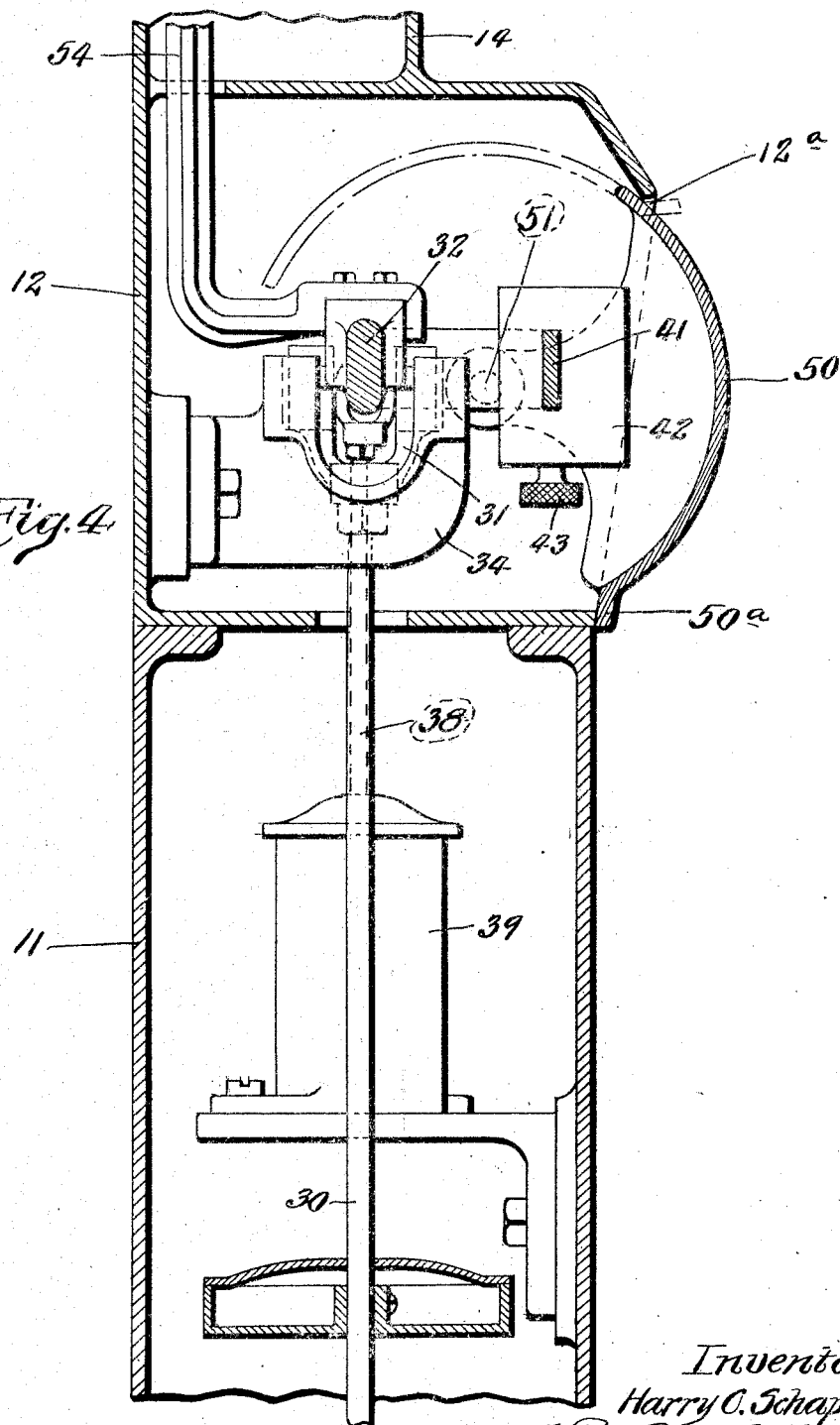

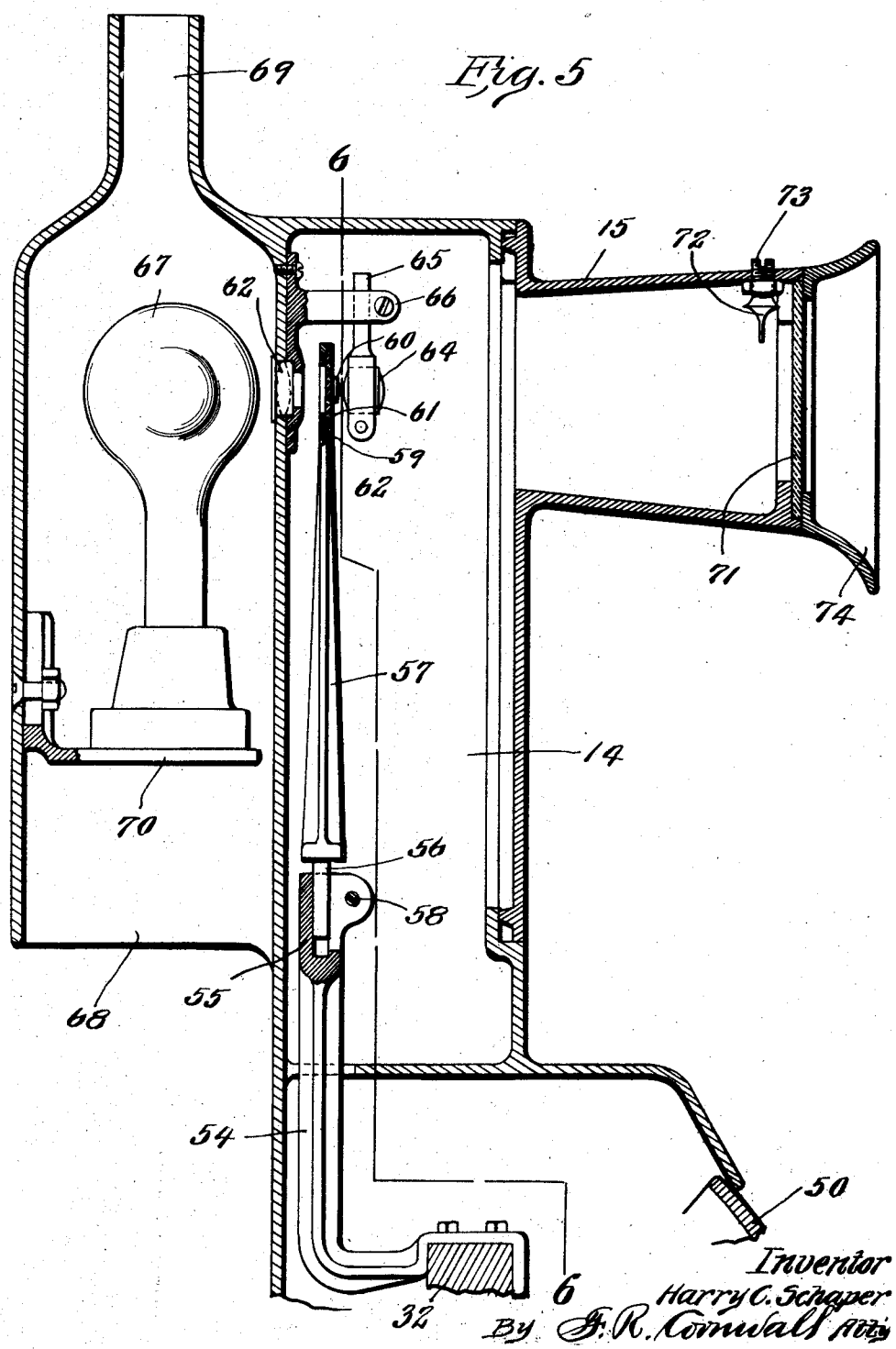

Inventor
Harry C. Schaper
By J. R. Cornwall

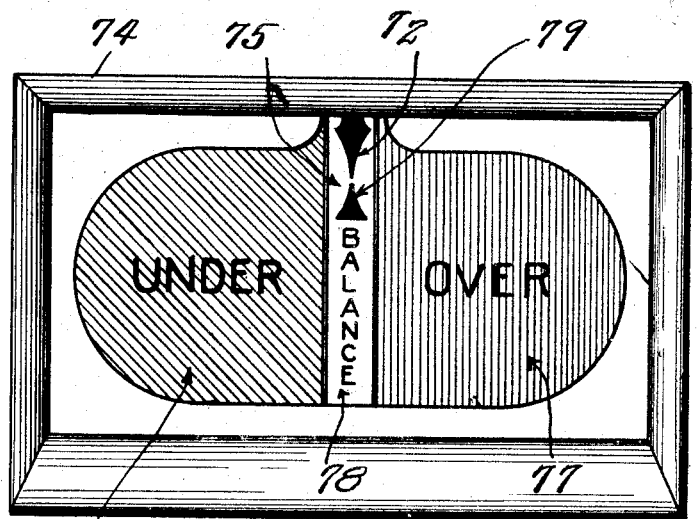
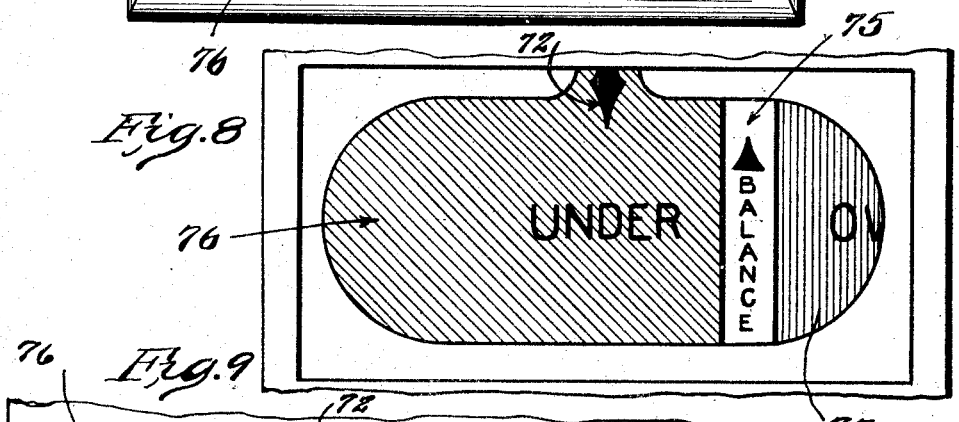
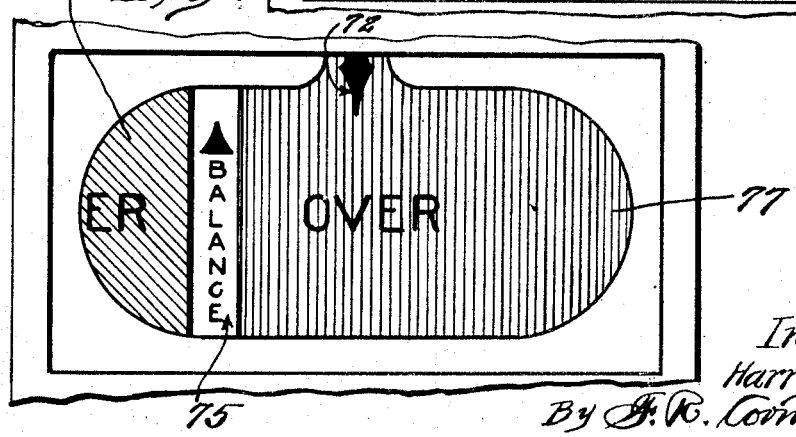

Patented Apr. 5, 1927.

1,623,276

UNITED STATES PATENT OFFICE.

HARRY C. SCHAPER, OF ST. LOUIS, MISSOURI, ASSIGNOR TO THE WEIGHT-O-GRAPH COMPANY, OF ST. LOUIS, MISSOURI, A CORPORATION OF MISSOURI.

WEIGHING DEVICE.

Application filed March 27, 1923. Serial No. 627,954.

This invention relates generally to weighing devices and more particularly to weighing devices for duplicating packages of a predetermined weight.

An object of the invention is to provide a weighing and duplicating device which is accurate, of strong and durable construction, and which may be readily and easily operated by any person.

Other objects of the invention are to provide distinct and easily read or distinguished means for indicating to the weigher whether the package is under or over weight or whether it is of proper weight, and to provide easily accessible means for adjusting the device for weighing packages of various sizes.

Another object of the invention is to provide a chart member and an indicating member therefor, one of which is movable relative to the other and to corelate said movable and said stationary members with each other so as to readily and accurately indicate whether the package is of the proper weight.

Other objects of the invention are to form the weight-receiving platform so that it will not accumulate spilled or loose material, and to construct a device of the class described in which the operating parts are effectually protected from dust and foreign matter.

With these and other objects in view, my invention consists in certain novel features of construction and arrangement of parts hereinafter more fully described and claimed.

In the drawings,

Figure 1 is a front elevation of the weighing device.

Figure 2 is a side elevation of the same.

Figure 3 is a vertical cross section through the base of the weighing device.

Figure 4 is a vertical cross section taken transversely through the lever housing and the upper end of the hollow support.

Figure 5 is a vertical cross section transversely through the upper end of the weighing device.

Figure 7 is a front elevation of the hood showing the chart of the weighing device in balanced position.

Figure 8 is a similar view showing the chart in under-weight position.

Figure 9 is a similar view showing the chart in over-weight position.

Figure 6:
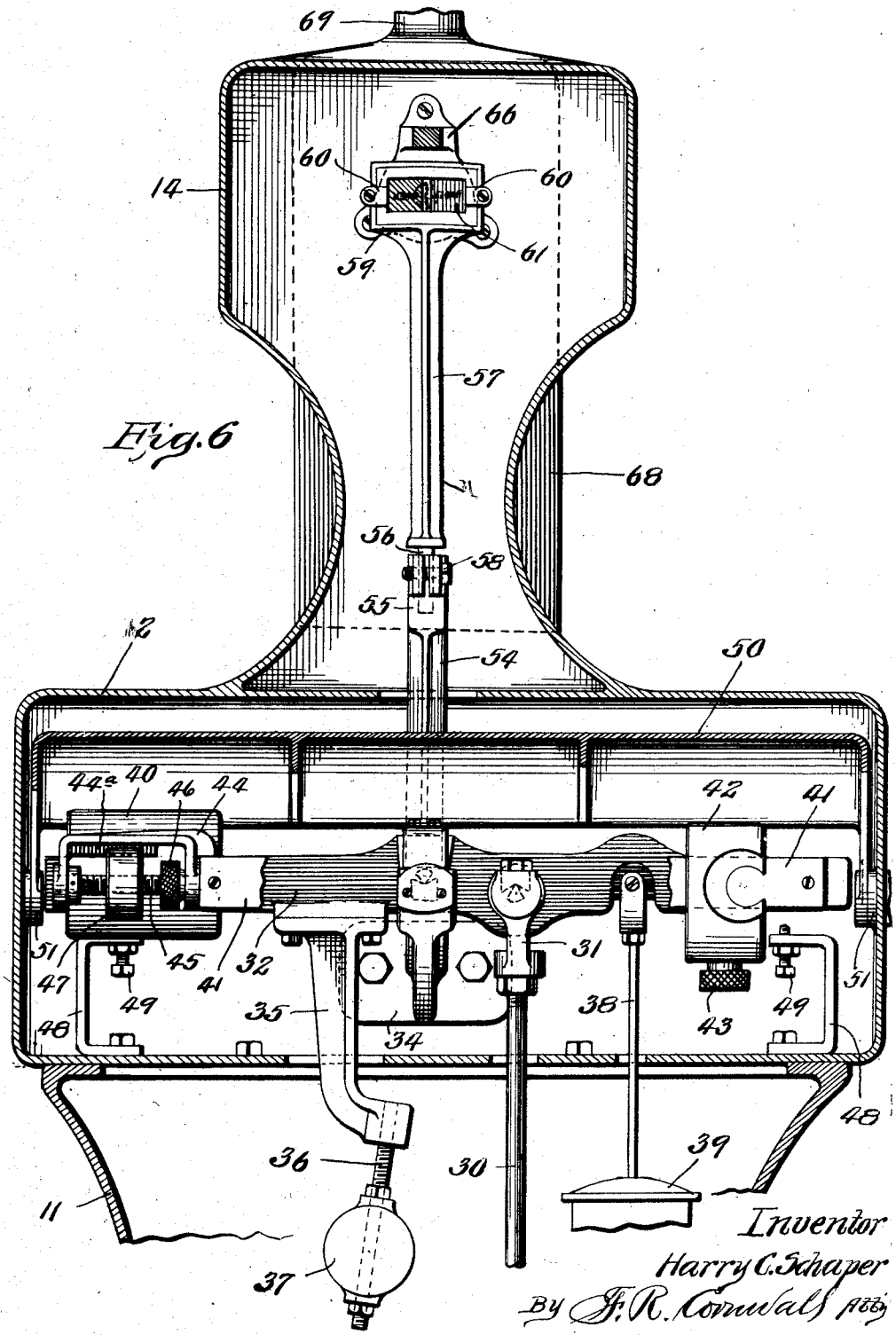
Figure 6 is a vertical cross section taken on line 6—6 of Figure 5.

This weighing device is particularly designed for weighing or duplicating packages of predetermined weight whereby when a package is placed on the weighing platform, the device will readily indicate whether the package is of the desired weight or whether it is over or under weight, and means are provided for regulating the device so that it can be adjusted for weighing or duplicating packages of various sizes.

Referring by numerals to the accompanying drawings, 10 indicates a box shaped base from the rear end of which projects upwardly a hollow support 11. The upper end of this support carries a rectangular housing 12, and projecting upwardly from this housing is an extension 14 which carries a forwardly presented hood 15.

A system of interengaged levers 16 and 17 is operatively supported in the base 10 and supports a spider 18. Projecting upwardly from said spider are bosses 19 and supported on the upper ends of said bosses are inverted cup-shaped pieces 20. A platform 21 is provided with downwardly projecting bosses 22, the lower ends of which rest on cup-shaped members 20 and are in engagement with centering pins 23 formed integral with and projecting outwardly from the bosses 19. The upper end of the base 10 is closed by a removable top 24, there being suitable openings provided in said top for the accommodation of the upwardly projecting bosses 19. A bracket 25 is fixed to the rear end of platform 21 and pivotally supported on the upper end of said bracket is an auxiliary platform 26. This platform 26 when not in use is adapted to be folded against the bracket 25 and when in its extended position is prevented from collapsing by arms 27 which are hinged at 28 to the bracket 25. The platforms 21 and 26 are formed in the shape of grids in order to readily shed the material which may be spilled and thereby prevent accumulation of material on said platforms, which accumulated material would affect the accuracy of the weighing device.

The lever 16 extends rearwardly in the base 10 and is provided with a nose portion 16ª which is in operative engagement with a loop 29 carried by the lower end of a steelyard rod 30. This rod extends upwardly through the hollow support 11 into the housing 12, and the upper end of said rod is fixed to a loop 31 which latter is supported on a lever 32 arranged in said housing. A bracket 34 is fixed to the rear wall of the housing 12 and is provided with V-shaped bearings for receiving the knife edge which forms the fulcrum for the lever or beam 32. An arm 35 is fixed to lever 32 and extends downwardly therefrom into the upper end of the support 11, and the lower end of said arm carries a threaded rod 36 on which is adjustably arranged a pendulum 37. A rod 38 is pivotally fixed to the lever 32 a suitable distance from the loop 31 and the lower end of this rod is provided with a piston which operates in a dashpot 39 suitably supported in the upper end of the member 11. This dashpot is filled with suitable liquid and the piston carried by the rod 38 and operating in said dashpot stabilizes the action of the lever 32 and prevents violent movement of the operating parts. The arm 35 and loop 31 are arranged on the opposite sides of the fulcrum of the lever 32, and that end of the lever which carries the arm 35 is further provided with a counterbalancing weight 40.

The lever 32 is provided with forwardly projecting extensions to which are fixed the ends of a bar 41 which is disposed parallel with the lever 32 and is spaced therefrom. A counterpoise 42 is slidably arranged on said bar and is adapted to be locked in position by a manually operable member 43. By sliding the counterpoise 42 on the bar 41 the lever 32 may be balanced. In order to provide sensitive adjustment for the lever 32, one end thereof is provided with an extension 44 in which is rotatably arranged a longitudinally disposed screw 45 which may be turned by means of a knurled wheel 46. The counterpoise 47 has threaded engagement with the screw 45 and is prevented from rotating with the screw by a longitudinally disposed rib 44$^a$ formed on said extension 44 and engaging a slot formed in counterpoise 47. Thus by turning the knurled wheel 46, the screw 45 is operated and the counterpoise 47, being held against rotation, is caused to move relative to the fulcrum of the lever 32 so that said lever may be accurately balanced. The brackets 48 are arranged near each end of the housing 12 and are provided with adjustable screws 49, the upper ends of which lie in the path of movement of the respective ends of the lever 32 and are designed to act as stops to limit the movement of said lever.

Access to the housing 12 is provided by an opening 12$^a$ formed in the front wall of said housing and this opening is adapted to be normally closed by a radial door 50 which is pivotally mounted at 51 to the side walls of said housing. A knurled wheel 52 is arranged to one side of the housing 12 and is fixed to the door 50 so that, by manipulating said wheel, the door 50 may be moved into open or closed position. The door 50 is provided with a downwardly projecting lip 50$^a$ which, when the door is in closed position, rests against the lower edge of the front wall of said housing and, when said door is moved into open position, engages the upper edge of the opening 12$^a$.

An extension 54 is fixed to the lever 32 immediately above and in alignment with the fulcrum of said lever and this extension extends upwardly through an opening formed in the top wall of the housing 12 into the extension 14. The upper end of this extension 54 is provided with a socket member 55, in which is seated a pin 56 formed on the lower end of an upwardly presented arm 57. The pin 56 is adjustable in the socket member 55 and when in adjusted position is adapted to be locked against movement by a screw 58. The arm 57 extends upwardly and the extreme upper end of said arm is provided with a rectangular frame 59 in which by means of clips 60 a chart 61 is adapted to be secured.

This chart 61 is designed to be placed in optical axis with a condensing lens 62 arranged in the rear wall of the extension 14 and a projecting lens 64 arranged forwardly of said chart and carried by a support 65 which is adjustably arranged in a bracket 66 fixed to the rear wall of extension 14. The condensing lens 62 is arranged between the chart 61 and a source of light 67, which latter is arranged in a housing 68 formed integral with and rearwardly of extension 14. This housing 68 is preferably open at its lower end and the upper end thereof terminates in a tubular extension or chimney 69 thereby insuring an efficient circulation of air through said housing. The source of light 67, which is preferably an electric light, is supported on a bracket 70 which is mounted for vertical adjustment on the rear wall of the housing 68.

The hood 15 is removably fixed to the front wall of the extension 14, said front wall being provided with a suitable opening and the forward end of said hood has arranged therein a translucent screen 71 which lies in the axis of the projecting lens 64. A pointer 72 is arranged in the hood 15 inwardly of the screen 71 and is preferably screw threaded in the upper wall of said hood to provide for vertical adjustment of said pointer. A lock nut 73 is provided for locking the pointer in its adjusted position. The forward end of the hood 15 is provided with a frame 74. the side walls of which are flared outwardly thereby partially shielding the screen 71 from the external light rays so that, when the chart 61 is projected onto said screen, said screen is partially shaded in order to render the projected image more distinct. The frame 74 has a centrally disposed cutout portion 75 through which the projected image of the pointer 72 is rendered visible. This cutout portion, furthermore, attracts attention to said pointer and serves to clearly bring out the central or balanced location of the chart.

This chart, which is made of transparent material, preferably glass, is divided into three zones which are distinctively marked to indicate the UNDER weight zone, 76, OVER weight zone, 77, and BALANCE or tolerance zone 78.

The under-weight zone is preferably colored green and has the word UNDER placed thereon; the over-weight zone is preferably colored red and has the word OVER arranged thereon, so that where the load is under or over weight, this information is conveyed to the weigher both by the color of the respective zone and the word arranged thereon. The BALANCE zone, which is arranged between the UNDER weight and the OVER weight zones, is preferably left plain and shows white on the screen and is provided with the word BALANCE and a centering mark or arrow 79, the point of which, when the device is in balance, is in alignment with the downwardly presented point of the pointer 72. This BALANCE zone is a comparatively narrow strip and is separated from the adjoining zones by parallel black lines 80. The width of the BALANCE zone 78 is calculated so that, as long as the pointer 72 occupies said zone, the weight of the article as registered by the duplicating device is considered correct under the standards controlling weights and measures. The arrangement of the chart with its varied colored zones indicates distinctly to the operator whether the article is under or over weight. By adding to, or taking from the load, the operator may correct weight of the article, whereupon the pointer 79 will be in vertical alignment with the projected image of the pointer 72.

The use of the distinctly varied colored zones enables the weigher to correctly weigh or duplicate the articles, even though he might not be able to read the marks on said zones.

In using the device, and assuming it is desired to weigh or duplicate packages of a predetermined weight, say, for instance, ten pounds, the standard weight of ten pounds is first placed on one of the platforms 21 or 26 and the lever 32 is then adjusted by manipulating the counterpoise 42 on the bar 41 to obtain the approximate balance. The wheel 46 is then manipulated to move the counterpoise 47 longitudinally until the arrow 79 of the balance zone 78 is in alignment with the stationary pointer 72. The weight is now removed from the weighing platform and the load or package which it is desired to weigh or duplicate is placed on the weighing platform. If the load is under weight, the lever 32 will be over-balanced, thereby moving the arm 57 carrying the chart 61 in the appropriate direction. This movement of the chart 61 will cause the UNDER weight zone 76 to be projected onto the screen, the BALANCE zone 78 being moved an appropriate distance away from the center of the screen so that the pointer 72 will be projected onto a green background and the arrow 79 in the BALANCE zone 78 will be moved out of alignment with the pointer 72. By adding to the load on the weighing platform, the lever 32 is restored to BALANCE and the arm 57 is moved toward the pointer 72. This restoring movement of the arm 57 will continue until the load on the platform reaches the exact weight, in the present case ten pounds, whereupon the BALANCE zone will occupy the central position on the screen and the pointer 79 will be in alignment with the indicator or pointer 72.

The package or load is now removed from the platform and a new package is placed thereon. If this package or load is over weight, or weighs more than ten pounds, the levers 16 and 17 will again be actuated and, through the rod 30, will operate the lever 32 so that the arm 57 moves to one side and the OVER weight or red zone is projected onto the screen with the BALANCE zone 78 occupying displaced position. By taking away from the load on the weighing platform, the lever 32 is actuated, causing the arm 57 to move toward its central position so that the BALANCE zone 78 is moved toward pointer 72. When the pointer 72 occupies the BALANCE zone, the operator knows that the weight of the load is approximately correct and if he wants the exact weight he may add to or take away from the load, as the case may be, until the arrow 79 is in alignment with the pointer 72.

When the duplicating device is set for weighing loads of predetermined weight, the opening 12ª in the housing 12, which opening provides access for adjustment of the lever 32, is closed by the door 50 and the device requires no further attention and is always ready for weighing or duplicating loads of predetermined weight for which it is adjusted.

The chart 61 may be adjusted relative to the optical axis of the projecting means by a releasing screw for the bolt 58 so that the shank 56 of the arm 57 may be adjusted in the socket member 55 of the arm 54. The auxiliary platform 26 is designed to be used in weighing or duplicating comparatively small packages. When it is desired to weigh comparatively large articles, the platform 26 is folded against the bracket 25, as shown in Figure 2, and the platform 21 is used, the folded platform 26 serving as a support for the article. The arrangement of the platform 21 on the spider 18 is such that no dust or loose material can enter through the cover 24 into the casing 10 and the grilled effect of the weighing platforms causes the loose or spilled material to drop onto the cover 24 which is "dead" and prevents the accumulation of material on said weighing platforms.

The counterbalancing weight 40 is designed to offset or counterbalance the lever system and parts associated therewith and occupies a fixed position. The counterpoise 42 is used to roughly adjust or bring in balance the beam or lever 32 when a load is placed on the weighing platform and is slidably arranged on the bar 41 which is carried by said lever. The locking member 43 is provided to lock the counterpoise 42 in position. The counterpoise 47 is used to obtain accurate adjustment of the lever after the counterpoise 42 has been adjusted on the bar 41. In order to obtain this fine adjustment, the weight 47 has screw threaded engagement with the screw 45 so that, by giving the knurled wheel 46 a slight turn, the weight 47 can be moved a slight distance in the appropriate direction.

The pendulum weight 37 carried by the arm 35 controls the range of movement of the chart member 57 so that, by adjusting said weight on the screw threaded rod 36, the extent of movement of the chart 61 may be regulated.

A duplicating or weighing device constructed according to my invention has a wide range of adjustments, is automatic in its action, is accurate and simple in operation and readily adaptable for various purposes, and can be easily operated by an inexperienced person.

While I have shown and described the preferred form of my weighing device, it is obvious that various changes in the size, form and construction of the parts of the weighing device may be made and substituted for those herein shown and described without departing from the spirit of my invention.

What I claim is:

1. In a weighing device, the combination with weighing mechanism, of a screen, an oscillatory arm, a chart on said arm and divided into a series of weight-indicating zones, means for projecting said zones in an enlarged form onto said screen, and means operable by said weighing mechanism for moving said arm, said means being adjustable whereby when a load of predetermined weight is placed on said weighing mechanism, said chart zones are projected onto said screen in a predetermined relation.

2. In a weight duplicating device, the combination with a load receiving mechanism, of a lever operatively connected thereto, a housing for said lever and provided with an opening to permit access thereto, an upwardly extending holder secured to said lever, a chart adjustably mounted on said holder, said chart being provided with weight indicating zones, and a door pivotally mounted at its ends for closing said opening.

3. In a weight duplicating device, the combination with a load receiving mechanism, of a housing provided with an opening, a lever arranged in said housing and operatively connected to said load receiving mechanism, an upwardly extending holder secured to said lever, a chart adjustably carried by said holder, said chart being provided with weight indicating zones, adjustable means in said housing for balancing said lever and the weight indicating zones carried thereby in accordance with a predetermined load, and a closure member for said housing for closing the access to said lever and said adjusting means.

4. In a weighing device, the combination with a lever adapted to be actuated in accordance with a load, of a vertically disposed arm fixed to said lever, a weight indicating chart carried by said arm and divided into distinctly marked weight indicating zones, a weight pendulum adjustably carried by said lever for regulating the range of movement of said chart and bringing said zones in the operative field in accordance with a predetermined load, a screen, and projecting means for projecting said zones on said screen.

5. In a weighing device, the combination with weighing mechanism, of a screen, a chart having a normal weight zone and an over and under weight zone arranged on opposite sides of said normal weight zone, means for projecting said chart on said screen, an indicator for centering the chart on the screen, and means for centering the weighing mechanism with the normal weight zone coordinated with the indicator and responsive to a predetermined load, said weighing mechanism being operable to move said chart to display said over and under weight zones respectively when the predetermined weight is exceeded or diminished.

6. In a weighing device, the combination with weighing mechanism, of a screen, a chart having three distinctively displayed weight zones, means for projecting said chart on said screen, and adjusting means in connection with the weighing mechanism for centering the central one of said zones responsive to a predetermined load, said weighing mechanism being operable to actuate said chart to display one or the other of the outside zones respectively when the predetermined weight is exceeded or diminished.

7. In a weighing device, the combination with weighing mechanism, of a transparent screen, a chart operable by the weighing mechanism provided with a plurality of distinctive indicia indicating predetermined weight zones, means for oscillating said chart responsive to predetermined loads, means for projecting the indicia carried by the chart onto said screen and means for centering the chart in response to loads of predetermined weight.

8. In a weighing device, the combination with weighing mechanism, of a screen, an arm having an oscillating arcuate movement, a chart carried by said arm, said chart having a plurality of distinctively displayed zones, means for projecting said zones on said screen, means operable by said weighing mechanism for moving said arm, and an adjustable device for centering the chart responsive to predetermined loads.

9. A weight duplicating device comprising a weighing mechanism including a load receiving platform, a lever actuated by said weighing mechanism, a support, an arm adjustably arranged in said support, a chart carried by said arm having distinctive indicia thereon indicating weight zones, a screen, means for projecting the indicia on said chart onto said screen, a device for calibrating said scale without load, and a device adjustable to display a selected zone of said chart responsive to a predetermined fixed load on said platform.

In testimony whereof I hereunto affix my signature this 3d day of March, 1923.

HARRY C. SCHAPER.